(12) United States Patent
Manas-Zloczower et al.

(10) Patent No.: US 12,473,419 B2
(45) Date of Patent: Nov. 18, 2025

(54) ONE-STEP, SOLVENT-FREE METHOD FOR RECYCLING AND REPROCESSING THERMOSET POLYMERS WITH TUNABLE PROPERTIES

(71) Applicant: CASE WESTERN RESERVE UNIVERSITY, Cleveland, OH (US)

(72) Inventors: Ica Manas-Zloczower, Cleveland, OH (US); Liang Yue, Cleveland, OH (US); Mehrad Amirkhosravi, Cleveland, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 750 days.

(21) Appl. No.: 17/750,730

(22) Filed: May 23, 2022

(65) Prior Publication Data
US 2022/0282056 A1    Sep. 8, 2022

Related U.S. Application Data

(63) Continuation-in-part of application No. 16/942,935, filed on Jul. 30, 2020, now Pat. No. 11,339,268.

(60) Provisional application No. 62/880,219, filed on Jul. 30, 2019.

(51) Int. Cl.
*C08J 11/16* (2006.01)
*C08J 11/26* (2006.01)

(52) U.S. Cl.
CPC ............ *C08J 11/26* (2013.01); *C08J 2363/02* (2013.01); *C08J 2367/06* (2013.01)

(58) Field of Classification Search
USPC .................................................. 521/40, 176
See application file for complete search history.

(56) References Cited

U.S. PATENT DOCUMENTS

| 10,155,842 B2 * | 12/2018 | Duquenne ............ C08G 59/682 |
| 10,457,806 B2 | 10/2019 | Groote |
| 2018/0312657 A1 | 11/2018 | Yue |

OTHER PUBLICATIONS

Jiang Yue, "Vitrimerization: A Novel Concept to Reprocess and Recycle Thermoset Waste via Dynamic Chemistry", Global Challenges, WILEY-VCH Verlag GmbH & Co. KGaA, 2019.

* cited by examiner

*Primary Examiner* — Terressa Boykin
(74) *Attorney, Agent, or Firm* — McDonald Hopkins LLC

(57) ABSTRACT

Thermosetting plastics are recycled by process that begins with grinding the plastic into small pieces. This particulate is then mixed with a catalyst and ball mill milled to a fine powder, which can then be reprocessed via molding (e.g., hot-press, injection, etc.).

21 Claims, 11 Drawing Sheets

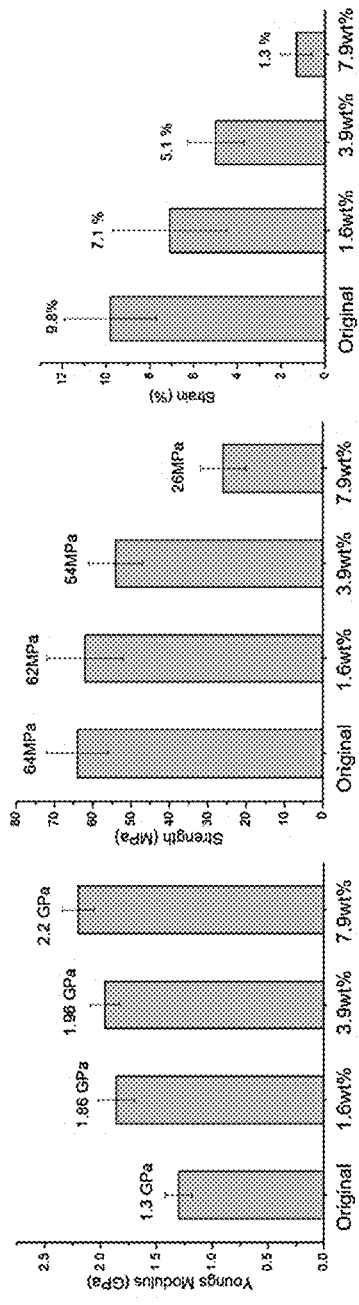
FIGURE 7A
FIGURE 7B
FIGURE 7C
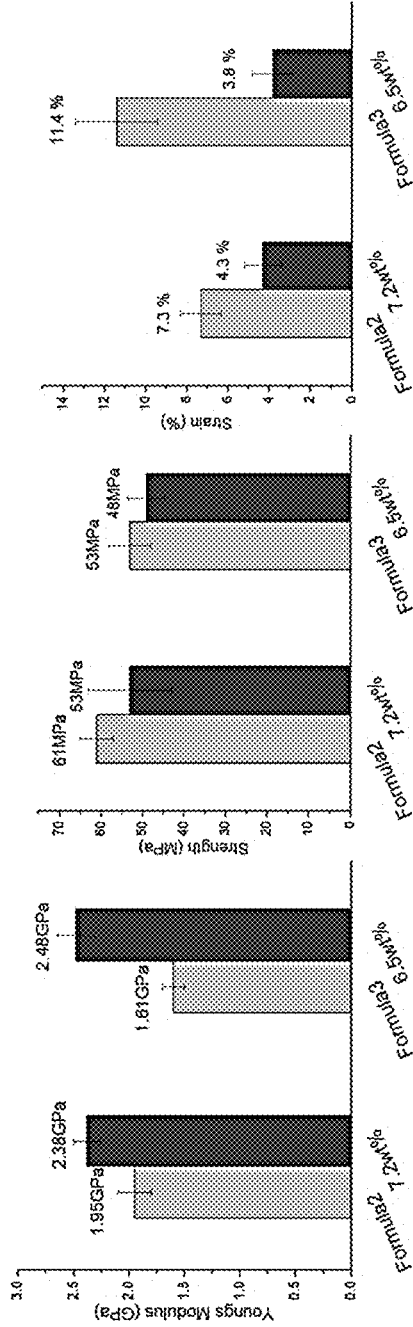
FIGURE 8A
FIGURE 8B
FIGURE 8C

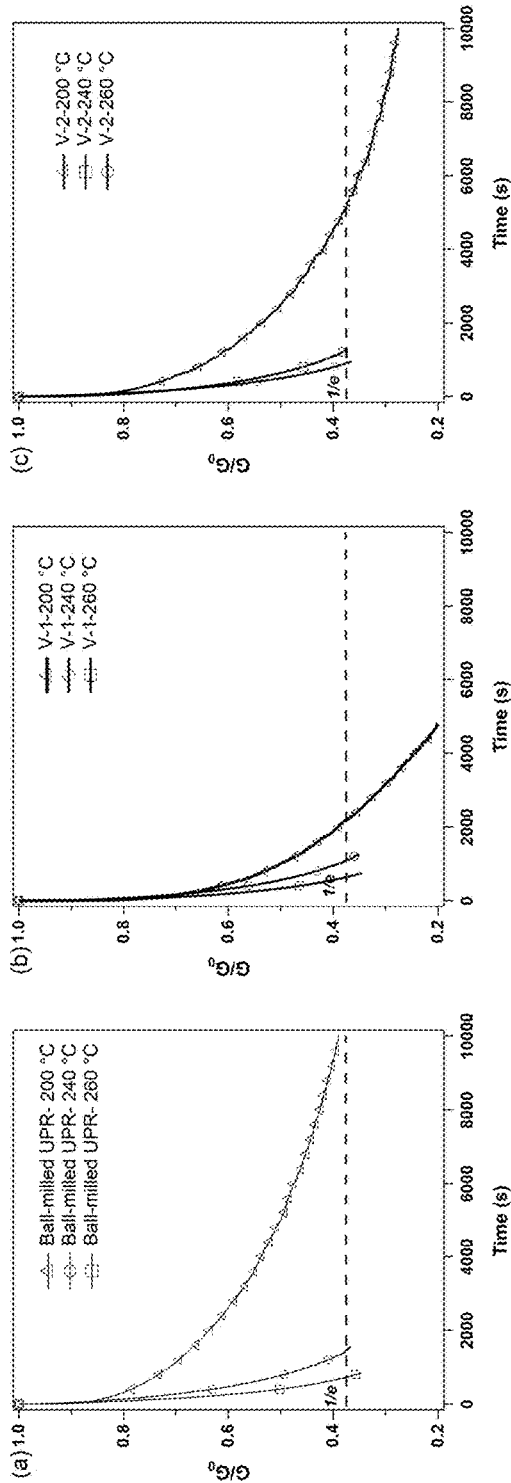
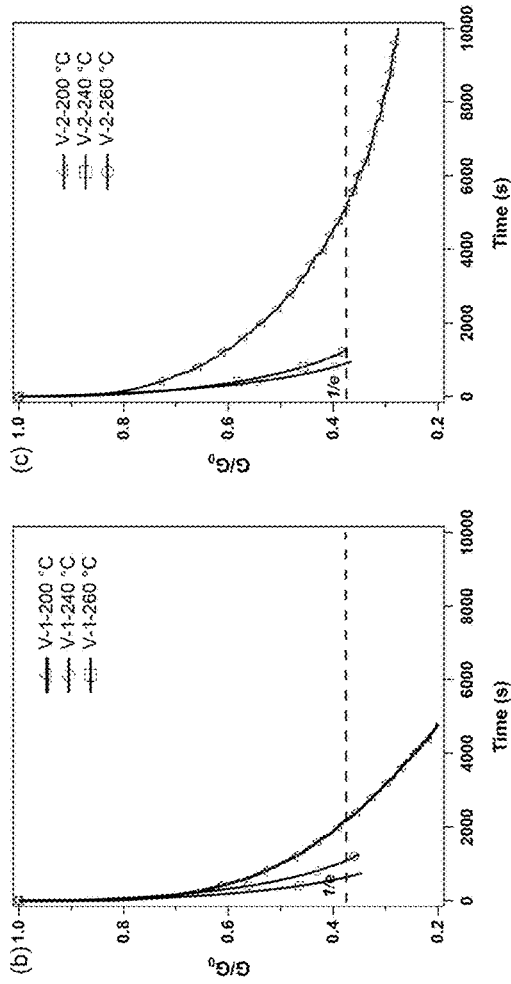
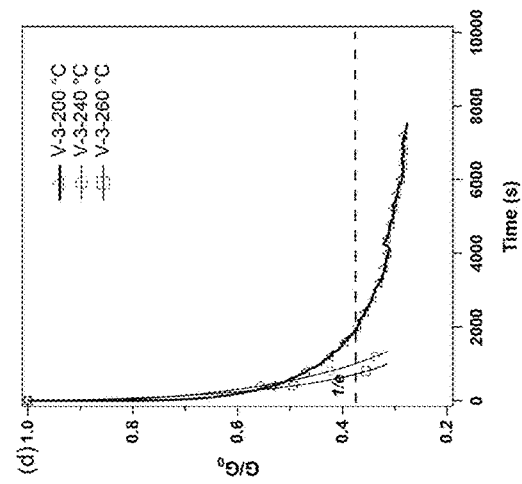
FIGURE 15A
FIGURE 15B
FIGURE 15C
FIGURE 15D

ONE-STEP, SOLVENT-FREE METHOD FOR RECYCLING AND REPROCESSING THERMOSET POLYMERS WITH TUNABLE PROPERTIES

REFERENCE TO RELATED APPLICATION AND TECHNICAL FIELD

This application claims priority to U.S. provisional patent application Ser. No. 62/880,219 filed on Jul. 30, 2019 and, as a continuation-in-part application, to U.S. Pat. No. 11,339,268 filed on Jul. 30, 2020 and granted on May 24, 2022. Both of cases are incorporated by reference herein.

This application relates generally to methods of recycling polymers and, more specifically, to methods and processes in which thermosetting polymers and especially unsaturated polyester resins are recycled and reprocessed by changing the permanent covalently cross-linked networks in these polymers into dynamic, cross-linked networks via grinding in the presence of a catalyst, followed by heating, extrusion, injection molding, and/or compression molding.

Also, This invention was made with government support under OISE-1243313 awarded by the National Science Foundation. The government has certain rights in the invention.

BACKGROUND

Thermosets are covalently cross-linked networks that, unlike thermoplastics cannot be reprocessed by melting or dissolution in any solvents. These networks can exhibit a glass transition temperature ($T_g$) lower than the designed application service temperature (elastomer/rubber) or higher than the service temperature (thermoset resins). Thermoset rubbers find applications in the automotive industry (interiors, bumpers), biomedical devices, bedding, furniture, packaging, gaskets, O-rings and so on. Non-limiting examples of such thermosetting polymers include various epoxy, polyurethane, and other similar resins, which are usually polymerized or copolymerized into cross-linked plastics, elastomers, and the like.

Usually thermoset resins exhibit significant benefits in comparison with thermoplastics exhibiting dimensional stability, high mechanical properties, high thermal/creep/and chemical resistance, durability. This class of polymers maintain their structural strength, thermal and electrical resistance characteristics during prolonged use. Thermosets find many industrial uses as coatings, adhesives but also in fiber reinforced composites for many high-tech applications. Composites high stiffness and strength in combination with their light weight make them play a vital role in the clean energy production (e.g. wind turbine blades, hydrokinetic power generation, support structures for solar systems and their encapsulations, and geothermal energy production) manufacturing of lighter vehicles (automotive, airplanes, trains, boats and aerospace) for reduced fuel consumption. There are many other applications requiring high structural strength and durability, thermal and corrosion resistance, such as structural materials for buildings, pipelines, industrial equipment and/or their components for instance heat exchangers, light-emitting diode lenses, fly-wheels for electricity grid stability, containers, or off-shore structures in which composite materials are the material of choice.

Despite the great features of thermosets, they are typically produced in relatively small quantities and are expensive. Their main advantage, which is retaining a lasting and intractable three-dimensional structure, creates also a crucial disadvantage since they cannot be recycled or reprocessed.

Unsaturated polyester resins (UPR) are of particular interest because these resins have been widely used as thermoset polymer systems since early 20th century. UPRs offer a variety of mechanical and chemical properties depending on the types of diols, diacids, crosslinkers, and initiators being selected, making them both low cost and extremely versatile. However, as with many of the other thermosets described herein, there is no feasible way known to the inventors for recycling UPR materials.

Recent efforts have been devoted to trying to induce re-formability and healing in chemically cross-linked polymer networks by using exchangeable chemical bonds that yield a dynamic cross-linked network. Polymeric systems containing such exchangeable bonds are covalent adaptable networks (CANs). Depending on the exchange mechanism, CANs can be classified to two different categories.

The first category of CANs comprises networks where the exchange mechanism of crosslinks is dissociative. For such networks, most of the cross-links break under certain conditions (temperature, UV-light exposure, pH,) and re-form again with a change in the conditions. These type of adaptive networks show a sudden and significant decrease in the viscosity, with breaking the cross-linking bonds.

In the second category, the mechanism of crosslinking is associative. Here, crosslinking bonds do not break until a new bond forms, which makes the network permanent and dynamic.

Vitrimers are polymeric associative CANs that have permanent networks and demonstrate a gradual viscosity decrease upon heating, which is a distinctive character of vitreous silica. By definition, vitrimers are polymeric networks made with covalent crosslinking. The crosslinking bonds of such networks have an associative nature which results in the ability of material to change its topology via exchange reactions. These reactions are triggered by heat, which causes a gradual decrease in system viscosity with increasing temperature and provides malleability to the network. The viscosity of vitrimers is governed by the chemical exchange reaction at elevated temperatures and like silica and, unlike dissociative networks and thermoplastics, decreases gradually. Vitrimers maintain permanent network at all temperatures until degradation, and they can swell but not dissolve in specific solvents. However, swelling ratios are higher for these networks in comparison with the non-dynamic ones.

Due to importance of polymer recycling, scientists are interested in the concept of designing materials based on cradle-to-cradle life cycle. Dynamic networks offer the opportunity to design materials considering the cradle-to-cradle concept. However, such systems do not exhibit properties at par with thermosets and are sometimes prone to early degradation. Application of such networks is restricted at high temperatures.

United States Patent Publication 2018312657 describes a reprocessing methodology for use on thermosets. An associative dynamic bonding scheme relies on swelling the thermoset network in a solution containing a catalyst, thereby allowing dynamic bond exchange between ester and hydroxyl groups. The resulting vitrimerized thermosets can be processed according to common thermoplastic manufacturing techniques. The entirety of this publication is incorporated by reference.

U.S. Pat. No. 10,457,806 discloses methods for preparing and subsequently using "pre-dynamic" cross-linked polymer compositions. These compositions are formed by combining finely divided powders of linear epoxy- and polyester-containing polymers with a transesterification catalyst in an extruder at temperatures up to 320° C. These compositions are precursors of vitrimers and require further curing (e.g., such as at temperature from about 50° C. up to 250° C. or more preferably exceeding the gel point of the resin) in order to create an actual, dynamic, cross-linked polymer composition. As such, the pre-dynamic compositions are proposed as a replacement for conventional thermoset materials, which characterized as not reprocessible and not recyclable.

In view of the foregoing, a solvent-free process for recycling thermosetting polymers would be welcomed. More particularly, a process that can be adjusted to account for different grades of thermoset and/or separate, anticipated uses for the recycled/reprocessed materials is also needed.

SUMMARY OF INVENTION

Methods of recycling thermosets—and particularly those comprised or consisting of UPR—are contemplated. The mechanochemical process involves ball-milling ground or particulate thermoset with a catalyst and, optionally, alcohol or polyol. This produces a vitrimerized polymer in which catalyst forms ligands within the thermoset, thereby creating a dynamic recyclable network.

Operation of the invention may be better understood by reference to the detailed description, drawings, claims, and abstract—all of which form part of this written disclosure. While specific aspects and embodiments are contemplated, it will be understood that persons of skill in this field will be able to adapt and/or substitute certain teachings without departing from the underlying invention. Consequently, this disclosure should not be read as unduly limiting the invention(s).

BRIEF DESCRIPTION OF THE DRAWINGS

The appended drawings form part of this specification, and any information on/in the drawings is both literally encompassed (i.e., the actual stated values) and relatively encompassed (e.g., ratios for respective dimensions of parts). In the same manner, the relative positioning and relationship of the components as shown in these drawings, as well as their function, shape, dimensions, and appearance, may all further inform certain aspects of the invention as if fully rewritten herein. Unless otherwise stated, all dimensions in the drawings are with reference to inches, and any printed information on/in the drawings form part of this written disclosure.

FIGS. 7A through 7C are data plots showing the effects of catalyst concentration on various tensile properties of the recycled thermosets, including Young's Modulus (FIG. 7A), strength (FIG. 7B), and strain (FIG. 7C) all as measured according to accepted laboratory procedures.

FIGS. 8A through 8C are comparative data plots showing the original and recycled tensile properties for different thermoset formulations, including Young's Modulus (FIG. 8A), strength (FIG. 8B), and strain (FIG. 8C) all as measured according to accepted laboratory procedures similar to those for the values reported in FIGS. 7A through 7C.

FIGS. 15A through 15D show stress relaxation curves for some of the materials in FIG. 14A but at varying temperatures (200° C., 240° C., and 260° C.).

DETAILED DESCRIPTION OF THE INVENTION

While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

As used herein, the words "example" and "exemplary" mean an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Generally speaking, the inventors have discovered a simplistic method for recycling heretofore unprocessable thermoset resin compositions through the careful selection of materials and processing conditions. Significantly, the processing conditions do not require the handling or use of solvents, thereby representing a significant improvement over the aforementioned approach in which catalysts are dissolved in a solution so as to induce swelling in the thermoset and expedite the overall recycling process.

Figure 1A:
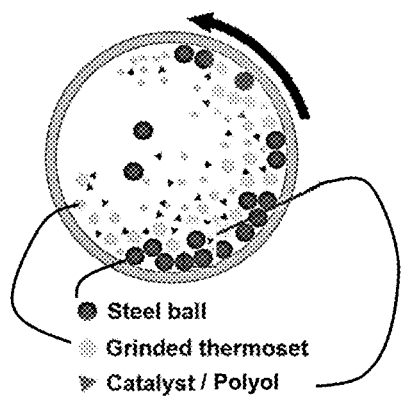
FIGS. 1A through 1D are schematic representations of the sequential steps according to certain aspects of the invention disclosed herein, with FIG. 1A representative of high energy ball milling, FIG. 1B showing breaking and welding of the particles, FIG. 1C illustrating the recycled fine powder, and FIG. 1D indicating hot press molding.
Figure 1B:
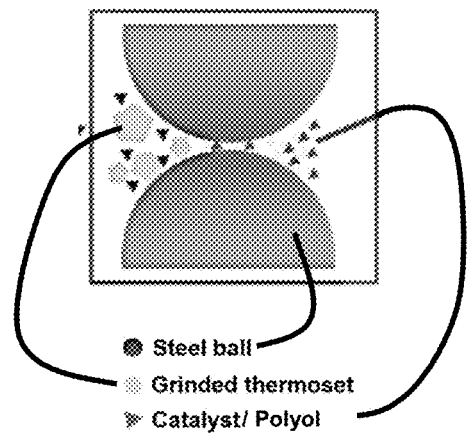

FIGS. 1A through 1D schematically represent the basic steps involved in recycling and reprocessing the thermoset waste. The waste is first grinded into small pieces and mixed with catalyst particles and, in certain embodiments, with alcohol/polyol (also represented by the triangles in FIG. 1A), in a rotating drum or other suitable milling device. Steel balls and/or other appropriate media are provided to the drum/mill, as illustrated in FIG. 1A, so that the rotational movement (shown by the arrow) ensures that the milling media (black circles representing steel balls) is intimately mixed with thermoset particulates (gray pentagons) and catalyst particles (black triangles). The rotation both promotes mixing and, owing to the collisions between particles, particulates, and/or the milling media, crushes and reduces the size of the particulates and forms metal-polymeric ligand sites (as shown in FIG. 2C). While a rotating drum is schematically illustrated, any conventional milling apparatus may suffice, while the steel balls may be replaced or augmented by other common milling media (provided that the milling media itself does not disintegrate or otherwise introduce unwanted materials). The milling media must be sufficiently durable to grind and pulverize the particles and particulates and impart the energy required to form the metal-polymeric ligand sites. Notably, the milling process illustrated in FIG. 1A can also be employed without the addition of catalyst/polyol for aspects described herein where vitrimerized thermoset merely needs to be ground for purposes of reprocessing (e.g., compression molding).

A suitable catalyst is chosen based on the chemistry of the thermoset network. In this example, zinc acetate is used as catalyst for the polyester type thermoset, which can undergo transesterification reaction. Zinc acetate is often used to catalyze such transesterification reactions in epoxy vitrimers owing to its comparatively low cost, nontoxicity, and high efficacy, and metal-ion coordination interactions in such systems are well known.

Generally, the catalyst can be chosen from metal salts of zinc, tin, magnesium, cobalt, calcium, titanium and zirconium. A catalyst with lower activation energy is preferred since it leads to faster transesterification kinetics. The catalyst may also be chosen from catalysts of organic nature, such as but not limited to, benzyldimethylamide, and benzyltrimethylammonium chloride. The catalyst should be chosen such as to have a sufficiently high degradation temperature to minimize deactivation/loss of the material under the expected milling conditions. Non-limiting examples may include: tin(II) 2-ethylhexanoate, 1,5,7-triazabicyclo[4.4.0]dec-5-ene (TBD), zinc(II)acetate (Zn(OAc)$_2$), triphenylphosphine (PPh$_3$), dibutyltin bis(2-ethylhexanoate), dibutyltin diacetate, dibutyltin dilaurate, dibutyltin bis (2,4-pentanedionate), titanium 2-ethylhexanoate, monobutyltin oxide, and zinc octoate.

The catalyst is utilized in an amount sufficient to produce a vitrimer having desired properties. Specific, non-limiting amounts of catalyst that have been found effective include 1.6, 3.9, and 7.9 parts by weight of catalyst per 100 parts of mixture to be milled (i.e., thermoset wate and catalyst combined). Thus, the catalyst may be provided at 1.5 wt. % or more, 4.0 wt. % or more, less than 8.0 wt. %, less than 10.0 wt. %, and any range of values bounded by these upper and lower limits. Advantageously, the amount of catalyst should be minimized or at least selected to balance against processing times and costs (as the catalyst may be more expensive to procure than the thermoset waste material).

By action of the milling, the catalyst becomes intimately mixed with the small pieces of thermoset waste. The waste (and, possibly, the catalyst) are reduced in size in order to generate fine powder mixture at 100% yield. This procedure called "vitrimerization" generates vitrimerized resin, which can be reprocessed via hot-press molding or injection molding, similar to known vitrimer-type materials.

Figure 1C:
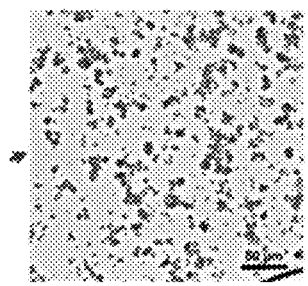
Figure 1D:
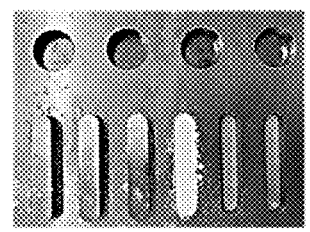

FIGS. 1C and 1D are, respectively speaking, schematic representations of the fine powder mixture and a hot pressing procedure which can used to form the powder mixture into recycled components. These steps are subsequent to formation of the catalyst-ligand complex that enables recycling of the powder created by FIGS. 1A and 1B (and as is schematically shown in FIG. 2C).

Fine powder will be understood to describe the comparative particle size. Powder is significantly smaller in average particle size and distribution in comparison to grinding. Both techniques are known in the art.

More specifically, fine powders are particles that flow freely when poured. In some aspects, substantially all of the material passes through a at least a no. 355 and/or a no. 180 sieve (i.e., both as per ISO standard 565-1972), meaning that substantially all particulates are smaller than the respective aperture sizes of 0.355 mm and/or 0.180 mm found respectively in such sieves.

Figure 2A:
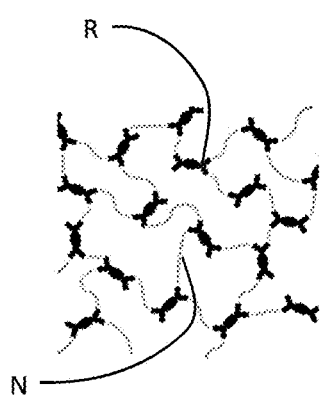
FIGS. 2A through 2C are schematic illustrations of network changes during the recycling and reprocessing of thermoset as an original composition (FIG. 2A), during the vitrimerization process (FIG. 2B), and as a final vitrimer with a dynamic network (FIG. 2C).
Figure 2B:
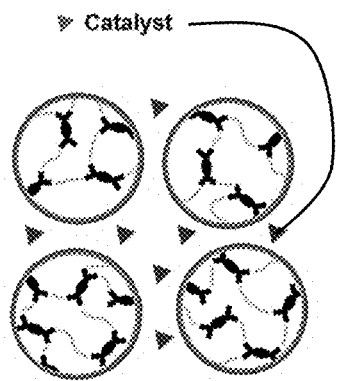
Figure 2C:
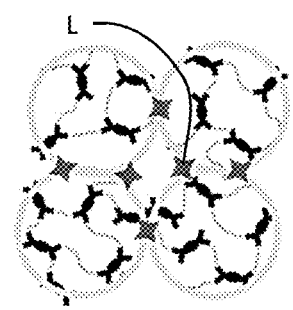
Figure 3A:
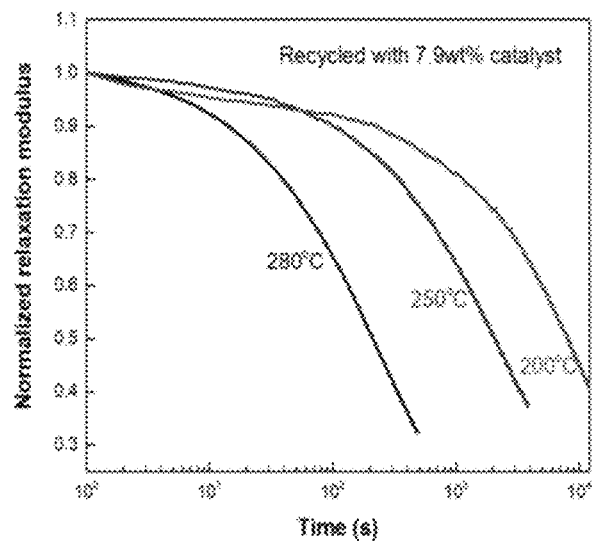
FIGS. 3A and 3B are data plots showing the effects of temperature (FIG. 3A) and catalyst concentration (FIG. 3B) on the stress relaxation of the vitrimerized thermoset.
Figure 3B:
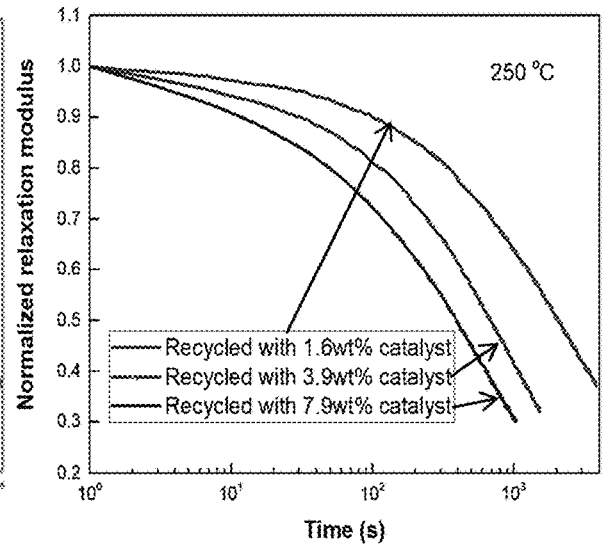

FIGS. 2A through 2C represent the structural aspect involved in the recycling process contemplated herein. The original or previously processed thermoset material (FIG. 2A) includes a regular and ordered network of bonds N connecting discrete resin components R. As the milling/grinding produces powder, network N is fractured into smaller pieces (particularly by rupturing relative weak bonding sites, e.g., as might be expected between zinc-oxygen bonds, etc.). The catalyst (black triangles) also becomes interspersed within these smaller pieces. In effect, this increases the surface area of the thermoset waste (i.e., the collection of resin R) as the powder is formed owing to high shear stress of the milling process (FIG. 2B).

Through this solid state, mechano-chemical vitrimerization process, a portion L of the catalyst forms a ligand with the resin R (in the examples where zinc acetate or other metal-containing catalysts are used, metal-polymer ligands are formed) as seen in FIG. 2C. The points indicated by reference elements L serve as substitutionally labile cross-link sites within the vitrimerized network and as junctions for the transesterification reactions, which enables the formation of a new dynamic network. Thus, the reprocessed thermoset is transformed into a vitrimer-type polymer, as seen in FIG. 2C. In turn, this vitrimer-type polymer can be reprocessed as suggested by FIG. 1D or as is otherwise known in the art.

Notably, once the vitrimer-type polymer is formed, it can be reprocessed and recycled without adding more catalyst. Dynamic analysis, including the data below, indicates the vitrimer-type polymer exhibits comparable characteristics to the original/"virgin" thermoset material. Also, its structure can easily accommodate nanofillers, such as cellulose nanocrystals (CNCs) or other similar fillers, to enable mass production of nanocomposites having improved material properties. The vitrimer-type polymers herein could also be used for fabricating fiber-reinforced composites. Finally, the vitrimer-type polymers herein convert a previously permanent, three-dimensional thermoset network into a vitrimer that is appropriate for repeated recycling.

With reference to the remaining data plots in FIGS. 3A through 12C, it will be understood that the temperatures, times, and other values disclosed in each plot are expressly disclosed in writing as part of this specification. Further, not only can values be discerned or extrapolated from these plots, they should also be understood in a comparative sense, at least with respect to those depicting different or sequential compositions. Lastly, where figures may have been subdivided into discrete charts (e.g., FIGS. 3A, 3B, and 3C), these plots may be collectively referred to by the number only for the sake of brevity (e.g., FIG. 3).

FIG. 3 illustrates the effect of temperature and catalyst concentration on the transesterification reaction rate in an epoxy/anhydride thermoset material recycled with a zinc acetate catalyst. Increasing the temperature or the catalyst concentration will enhance the transesterification reaction, which can be observed by the increased stress relaxation. Thus, by controlling the reprocessing temperature or catalyst loading, the transesterification reaction rate can be controlled.

The transesterification reaction rate will also depend on the ratio of hydroxyl to ester groups in the original thermoset system. Thus, in one aspect, the ratio of hydroxyl to ester groups is measured and/or selected in the thermoset waste material prior to milling, so as to inform the amount of catalyst and/or time required during milling.

Figure 4:
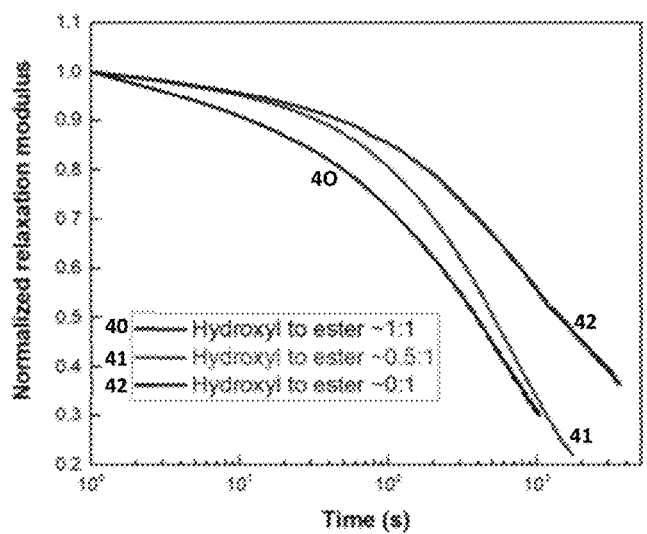
FIG. 4 is a data plot showing the effect of free hydroxyl to ester ratio in the original thermoset on the stress relaxation of the recycled systems at 250° C.

FIG. 4 demonstrates that for three different epoxy/anhydride resin formulations with varied hydroxyl to ester group ratio in the cross-linked networks, the same methodology can be applied to convert the thermoset into dynamic network. The original thermoset with a hydroxyl to ester group ratio of 1:1 can be recycled with 7.9 wt. % zinc acetate, while a material with ratio of 0.5:1 (i.e., 1:2) was recycled with 7.2 wt. % zinc acetate and a starting material with only trace amounts of hydroxyl to ester (i.e., a ratio of <0.1:1) was recycled with 6.5 wt. % zinc acetate. All such materials exhibit acceptable properties upon being recast (i.e., hot pressed or injection molded) as recycled materials after processing.

Accordingly, in certain aspects, a hydroxyl:ester ratio of at least 1:2, less than 1:1, greater than 1:10, and less than 1:10 may form the upper and/or lower limits of the thermoset waste material selection parameters. More generally, the thermoset may comprise detectable amounts of both hydroxyl and ester groups to ensure the efficacy of the catalyst.

Figure 5:
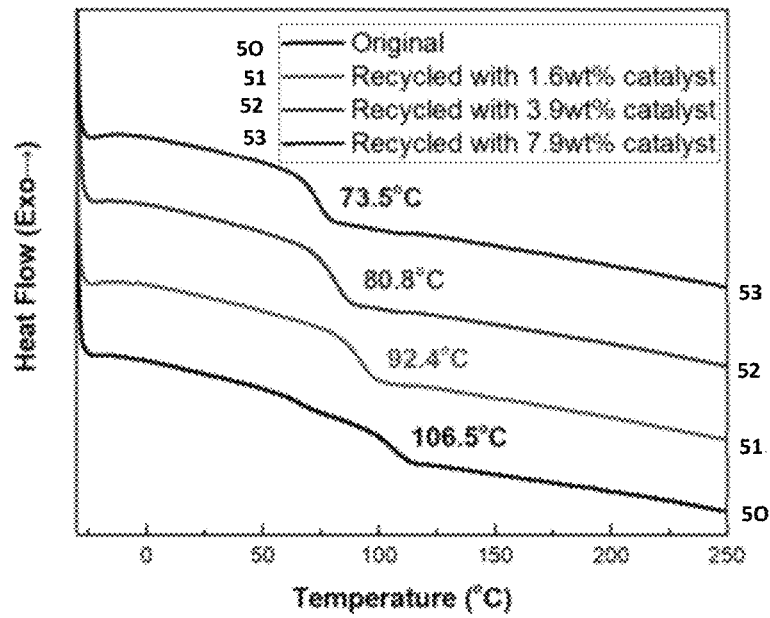
FIG. 5 is a data plot showing the effect of catalyst content on glass transition temperature of recycled thermoset.
Figure 6:
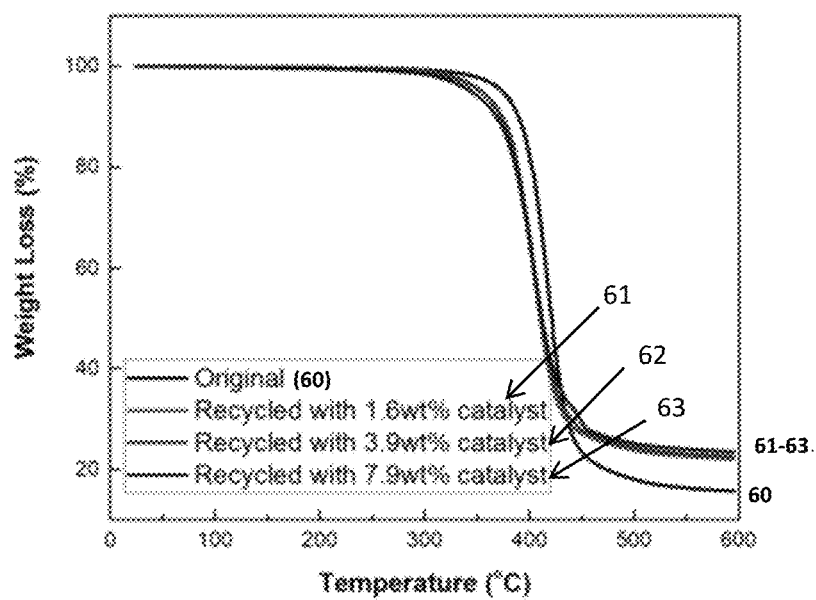
FIG. 6 is a data plot showing the effect of catalyst concentration on the thermal stability of the recycled thermoset.

FIG. 5 displays the glass transition temperature (Tg) of recycled epoxy/anhydride thermoset. Increasing the catalyst loading will clearly decrease the Tg. Thermal stability of the recycled thermoset will slightly decrease with increasing the catalyst concentration, but not significantly as seen in FIG. 6. Thus, the recycled material performs at a comparable level as compared to the original thermoset, at least with respect to Tg and thermal stability.

FIG. 7 illustrates that the mechanical properties of the recycled epoxy/anhydride materials can be tuned by changing catalyst loading. Young's modulus of the recycled materials is even higher than the original thermoset. The recycled materials have more rigid networks at room temperature than the original epoxy/anhydride networks. With less catalyst loading, more tensile strength could be recovered after recycling and reprocessing. In this manner, the mechanical properties of the recycled thermoset may be tuned by controlling the catalyst loading during processing.

Figure 9A:
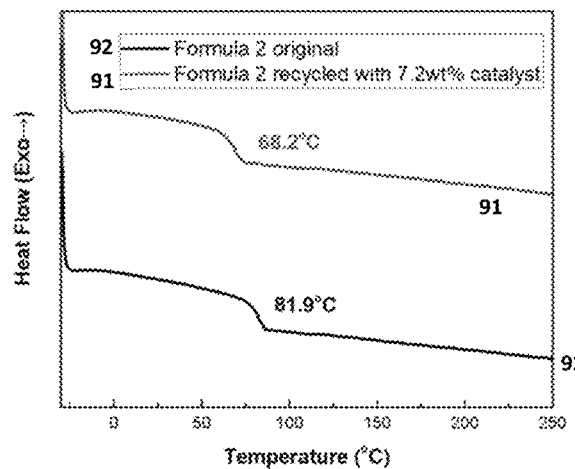
FIGS. 9A and 9B are comparative data plots showing the original and recycled system glass transition temperature for different thermoset formulations.
Figure 9B:
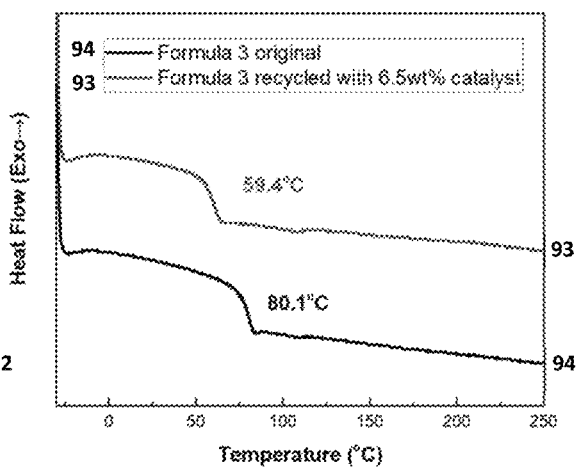
Figure 10A:
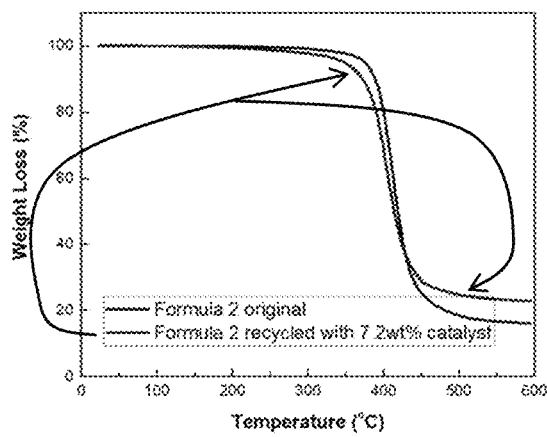
FIGS. 10A and 10B are comparative data plots showing the original and recycled system thermal stability for different thermoset formulations.
Figure 10B:
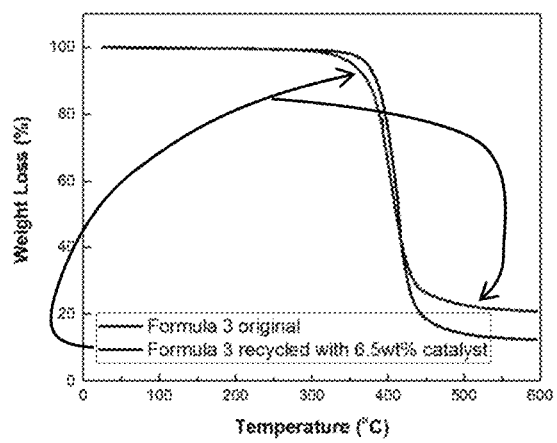

FIGS. 8, 9 and 10 illustrate, following the same trend, that the Tg, thermal stability and mechanical properties are all tunable by simply controlling the catalyst loading during the recycling processing, regardless of the original formulation of the epoxy/anhydride thermoset. Here, the results for two formulas with different free hydroxyl to ester group ratio are demonstrated.

The one-step solvent-free methodology illustrated here for thermoset systems using for vitrimerization the transesterification reaction, can be applied to recycle any type of polyester thermoset polymer, including epoxy/acid thermoset, epoxy/anhydride thermoset, polyurethane thermoset, and vinyl ester thermoset. More specifically, the thermoset waste should include at least one crosslinked thermoset polymer capable of forming a vitrimer composition. For example, crosslinked thermoset polymers include, but are not limited to, polyester based polyurethane, epoxy, polyesters and any crosslinked network which has ester groups on the backbone of the polymer as well as available OH groups on the structure.

Figure 11:
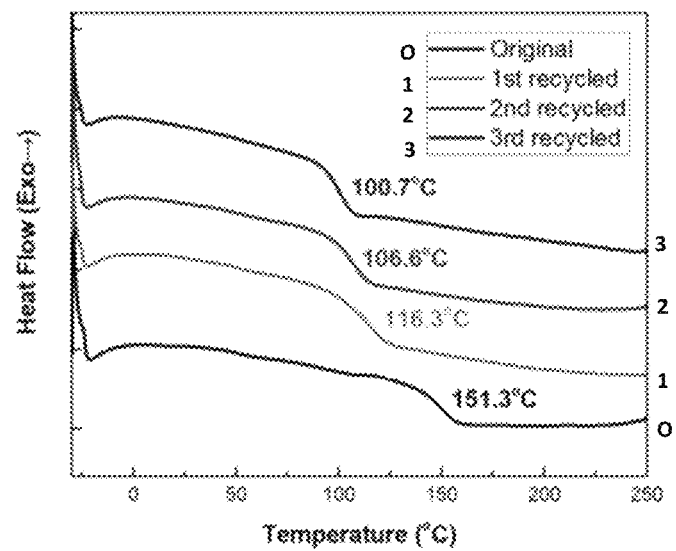
FIG. 11 is a data plot showing the effect of multiple recycling and reprocessing on the glass transition temperature of the recycled thermoset.
Figures 12A, 12B, 12C:
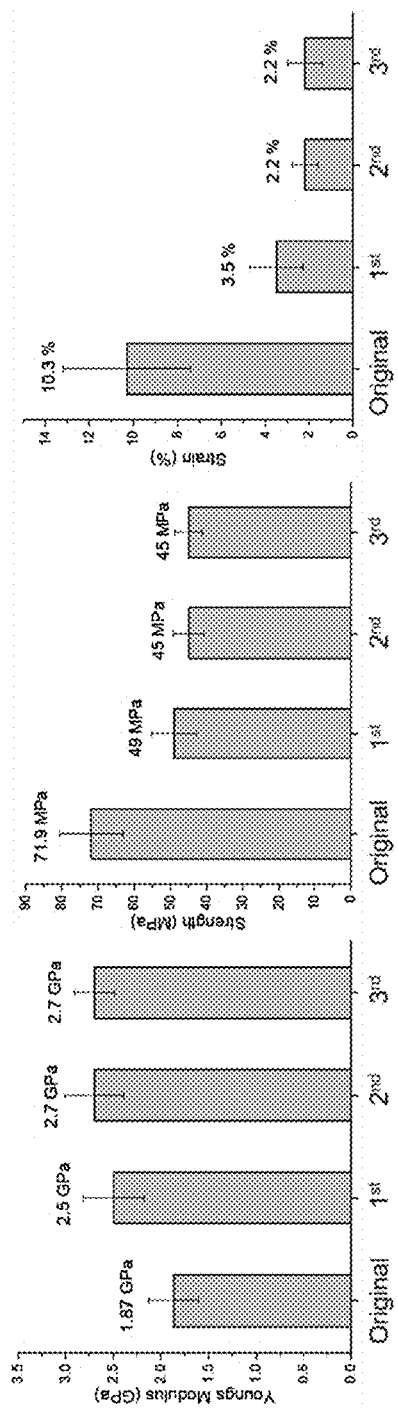
FIGS. 12A through 12C are comparative data plots showing the effects on tensile properties of multiple recycling and reprocessing sequences (e.g., original material, $1^{st}$ cycle, $2^{nd}$ cycle, etc.) of a recycled thermoset material according to various aspects disclosed herein, including Young's Modulus (FIG. 12A), strength (FIG. 12B), and strain (FIG. 12C) all as measured according to accepted laboratory procedures similar to those for the values reported in FIGS. 7A through 7C.

To further demonstrate the process, a commercial epoxy/anhydride formulation (Epon 828 resin, methylhexahydrophthalic anhydride hardener and 1-methylimidazole accelerator) was recycled with 5.4 wt % zinc acetate catalyst using the invented methodology and reprocessed multiple times as contemplated in FIGS. 11 and 12. Once the cross-linked network is "vitrimerized" into a dynamic network, it becomes recyclable and reprocessable for multiple cycles without adding more catalyst.

FIG. 11 illustrates the effect of multiple recycling on the system Tg (there is a slight decrease in Tg with multiple recycling). However, after three times reprocessing, the recycled thermoset retains almost the same mechanical performance as the original recycled thermoset as displayed in FIG. 12.

The invented methodology can be also applied to manufacture nanocomposites by simply adding the appropriate nanofillers with the thermoset waste and catalyst during the ball milling processing. Thus, properties like electrical or thermal conductivity, fire retardancy, electromagnetic shielding can be imparted on the composite with the appropriate filler selection. The high shear stress could efficiently disperse the nanofillers into the polymer without any dispersion agent. Nanocomposites produced by the invented methodology could also avoid the re-aggregation or phase separation of the nanofillers, generally present in traditionally manufactured thermoset resin nanocomposites involving filler dispersion in a liquid phase.

Figures 13A, 13B, 13C:
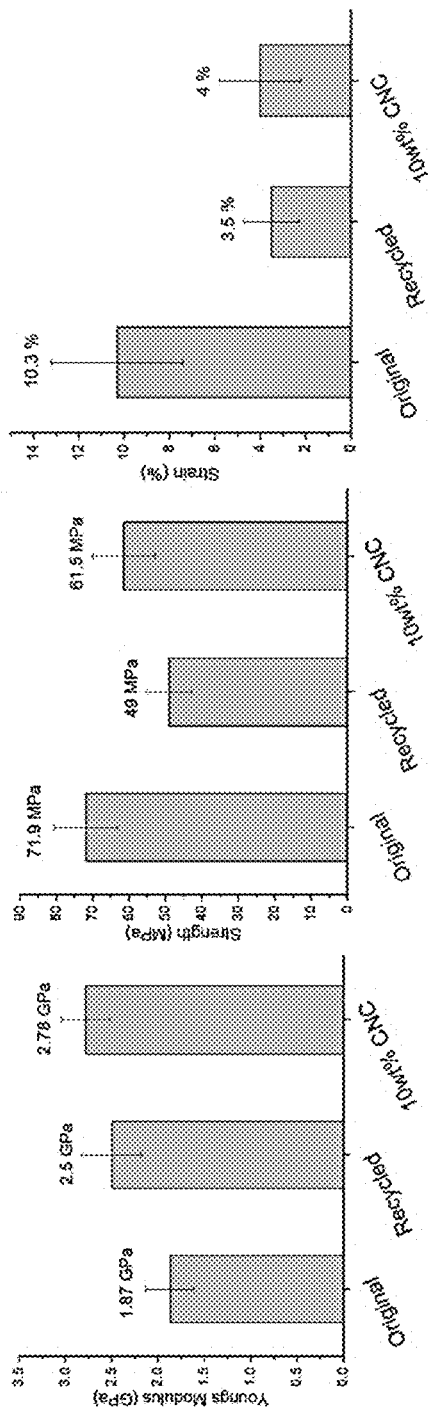
FIGS. 13A through 13C are data plots showing the reinforcement effect of cellulose nanocrystals (CNC) on tensile properties of a recycled thermoset material according to various aspects disclosed herein, including Young's Modulus (FIG. 13A), strength (FIG. 13B), and strain (FIG. 13C) all as measured according to accepted laboratory procedures similar to those for the values reported in FIGS. 7A through 7C.

FIG. 13 is an example of recycling the commercial epoxy/anhydride formula with cellulose nanocrystals (CNC) to reinforce the mechanical properties of the recycled thermoset. With 5.4 wt % zinc acetate as catalyst and 10 wt %

CNC as filler, the recycled epoxy shows a 50% increase in modulus and recovers 85% of the tensile strength of the original thermoset.

Advantages of the disclosed method include the elimination of any solvents. Further, ball milling can be achieved at low temperatures (i.e., without the need for providing external sources of heat and typically lower than 300° C. or less). Milling operations can be engineered to incorporate batch or continuous feed processes, with the latter requiring material feed rates to be controlled in combination with the milling conditions to ensure sufficient resident time is achieved in the mill, with gravity-induced inclines, rotation of the milling chamber, and/or release valves providing further measures of control.

The transesterification reaction can also be used specifically for vitrimerization of UPR, such as styrene assisted crosslinked UPR. To demonstrate the feasibility of this process, vitrimerized UPRs were obtained through ball milling of the crosslinked unsaturated polyester with different concentrations of alcohol (10, and 15 wt. % relative to UPR) and catalyst (10 mol. % relative to hydroxyl groups in alcohol) (Table 1). The crosslinked UPR is also ball milled without addition of alcohol or catalyst to explore the effect of ball milling on the formation of radicals in the UPR network.

TABLE 1

Initial composition of the vitrimerized samples and reference material.

| Sample Code | Unsaturated Polyester [g] | Dipenta-erythritol [g] | Catalyst [g] (10 mol % relative to hydroxyl groups in dipentaerythritol) |
| --- | --- | --- | --- |
| Ball milled UPR | 10 | 0 | 0 |
| V-1 | 10 | 1.5 | 0.649 |
| V-2 | 10 | 1.0 | 0.433 |
| V-3 | 10 | 0 | 0.649 |

The mechanochemical process for recycling resident UPR includes two simple steps; (i) ball milling of cured UPR, with or without dipentaerythritol alcohol and a catalyst; and (ii) compression molding of the ball milled sample at 200° C. It is important to note that the cured unsaturated polyester resin should be grinded to small particles (with each particle in the mixture having a diameter of <10 mm, <1.0 mm, or most preferable <0.50 mm) prior to ball milling.

The incorporation of an appropriate catalyst facilitates the transesterification exchange reaction, and the crosslinked thermoset network converts to a dynamic network. Zinc acetate was selected as catalyst for the transesterification reaction because it is non-toxic, and highly efficient. The metal ion interactions in these networks have been comprehensively investigated. In a typical polyester vitrimer network, carboxylate groups attach as a ligand to Zn'. These complexes are linkages for the transesterification exchange reaction and serve also as exchangeable unstable crosslink junctions in the vitrimer network.

It was determined that adding excess of external alcohol (e.g., polyols such as dipentaerythritol) in the thermoset matrix can inhibit the formation of zinc carboxylate complexes during the ball milling, with the intensity of Fourier-transform infrared spectroscopy (FTIR) peaks associated with carboxylate-zinc vibrations followed the order V-3>V-2>V-1 (even though the actual mass of catalysts provided to V-2 was less than that in V-1). Without wishing to be bound by any theory, the zinc carboxylate complexes created through vitrimerization act as physical crosslinking junctions and increasing the catalyst amount (i.e., increasing zinc carboxylate complexes) results in higher crosslinking density and storage modulus. FTIR analysis supports this conclusion, so that excess addition of external hydroxyl groups may inhibit the formation of zinc carboxylate complexes, and consequently reduce the crosslinking density. In fact, the vitrimerized samples of Table 1 are comparable with the initial UPR.

Notably, alcohols mean any carbon-based molecule with at least one hydroxyl group. Alcohols capable of being provided in solid and/or powdered form should be particularly useful, as are polyols which contain multiple hydroxyl groups attached at various points along the carbon-base. Such alcohols and polyols may be straight-chained, branched or cyclic. Alternatively, other fillers such as cellulose nanocrystals, and carbon nanotubes or silica particles functionalized with hydroxyl groups can be used as feed stock of free hydroxyl groups to improve the recycling efficiency of thermosets.

It was also found that the amount of catalyst and formation of zinc carboxylate complexes are more important for converting the UPR thermoset into a vitrimer than the concentration of external hydroxyl groups in the system. This method shows potential for converting UPR thermoset waste already present in the market into vitrimers and is appropriate for industrial applications. The results can provide guidance to overcome the challenges in recycling unsaturated polyester thermoset polymers and tailor the properties of the vitrimerized systems with the least environmental impact.

Figure 14B:
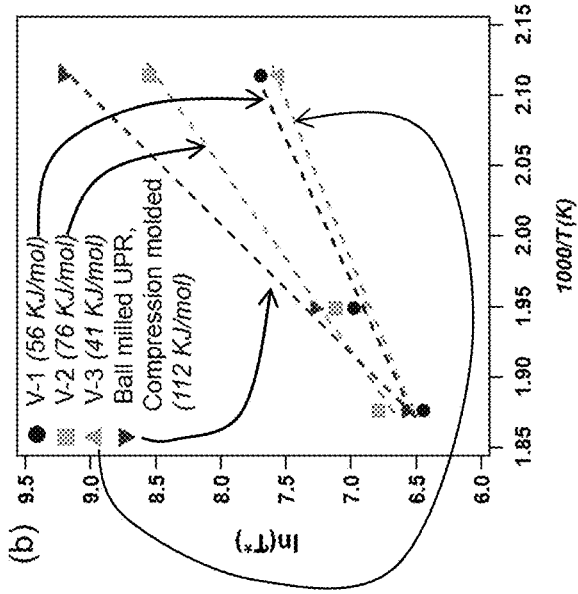
FIG. 14A shows the stress relaxation curves of various forms of unprocessed UPR, milled and compression molded UPR, and the samples in Table 1 at 200° C., while FIG. 14B are corresponding Arrhenius plots of measured relaxation times at various times and temperatures.
Figure 14A:
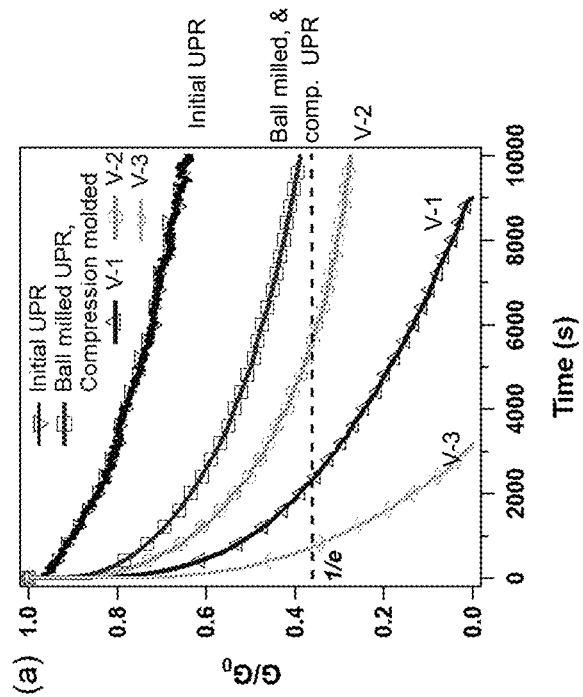

The stress relaxation results for different samples for the inventive samples in Table 1 (see FIGS. 14A and 15A through 15D) were similar to other vitrimer polymers in which the time and temperature-dependent stress relaxation behavior can be expressed by an Arrhenius equation (see FIG. 14B). The lowest activation energies are for the V-3 and V-1, which are the samples with the highest amount of catalyst in the system (Table 1). On the other hand, the activation energy for the ball milled UPR without catalyst is significantly higher compared to the other samples. The high activation energy for ball milled UPR indicates the importance of adding catalyst in the vitrimerization process to facilitate the transesterification reaction. Figures s Since the permanently cross-linked networks cannot relax the stress, these results point out to the exchange reaction and consequently topology rearrangement in the vitrimerized network. As expected, the V-3 samples has the fastest stress relaxation rate, due to the enhanced formation of metal-ligand complexes in the network.

Figure 16B:
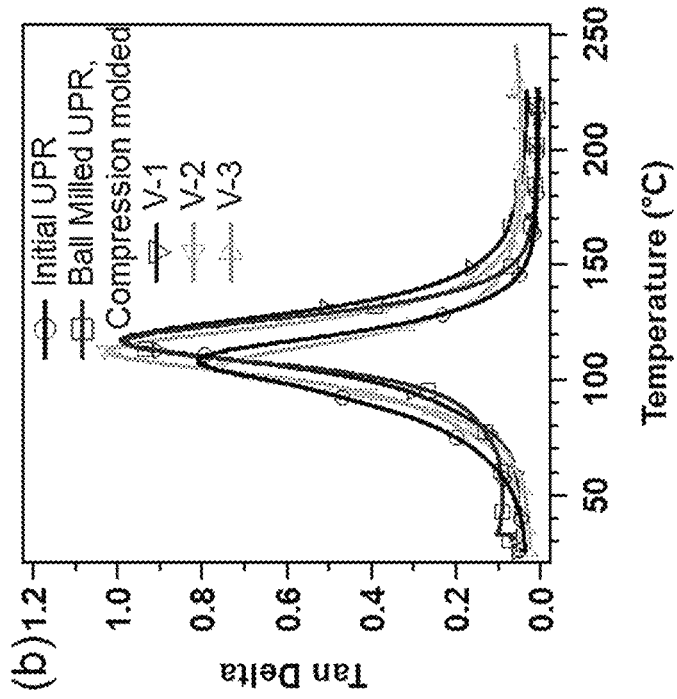
FIG. 16A shows the storage modulus and 16B the Tan delta, both for initial UPR, ball milled and compression molded UPR, and the samples in Table 1.
Figure 16A:
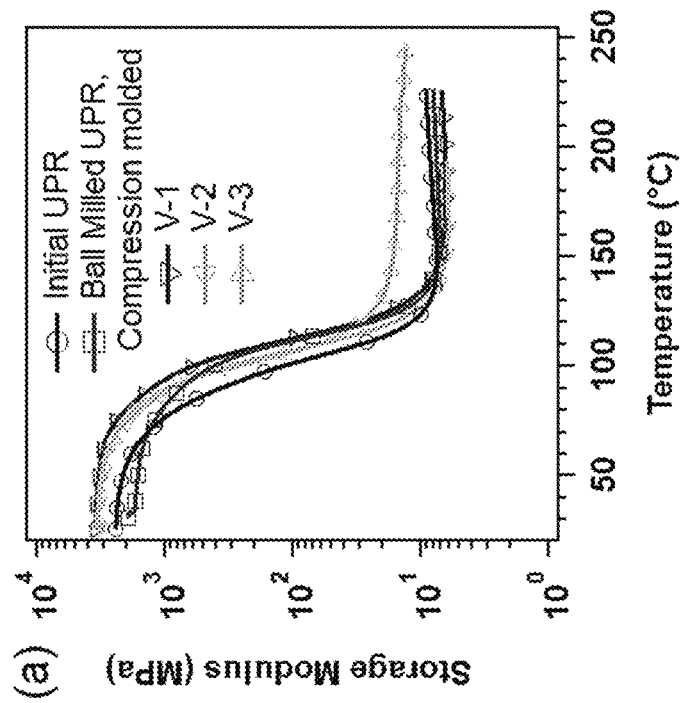
Figure 17:
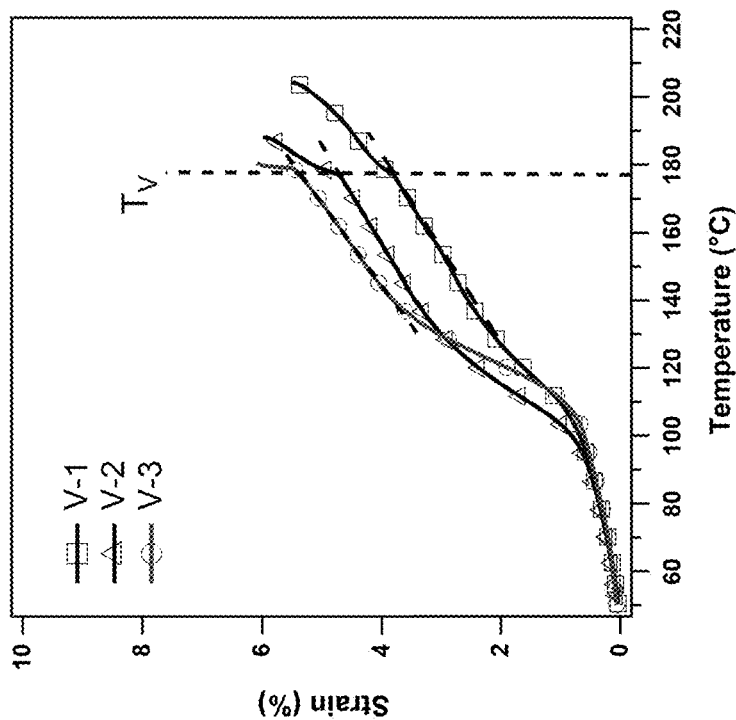
FIG. 17 shows dilatometry results for the vitrimerized samples in Table 1.
Figure 18:
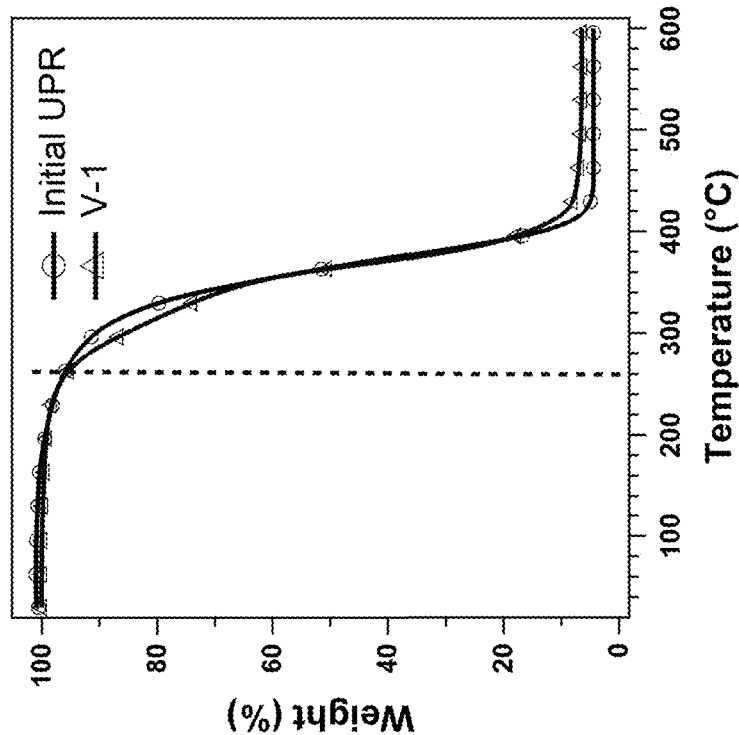
FIG. 18 is a thermogravimetric analysis of weight loss for initial UPR vs. a vitrimized sample.

The storage modulus of the vitrimerized samples is higher than the initial polyester at room temperature (see FIG. 16A). The storage modulus starts to decrease linearly before the glass transition temperature ($T_g$) and then sharply decreases around $T_g$ reaching a rubbery plateau. The molecular weight between successive crosslinks, $M_e$, can be obtained from $G_p \cong \rho RT/M_e$, where $G_p$ is the storage modulus of the rubbery plateau at temperature T and $\rho$ is the polymer density. A higher rubbery plateau modulus points out to higher crosslinking density. Thus, from the results we can conclude that the V-3 sample has the highest crosslinking degree.

The concentration of hydroxyl groups in the commercial UPR resin studied in this work after ball milling is sufficient to enable reprocessing of the ball milled UPR without catalyst. However, reprocessing of the ball milled UPR without catalyst through conventional methods, such as injection molding, may not be sufficiently efficient due to the limited transesterification reaction rate.

The tensile and impact strength properties of the initial and vitrimerized samples are displayed in Table 2. Overall, the ball milled UPR and the vitrimerized samples show a more rigid network with lower elongation at break. The vitrimerized sample with the highest content of dipentaerythritol (V-1) has the lowest strength and elongation at break. The excess alcohol present in the system may contribute to the dynamic network heterogeneity and may result in overall poorer mechanical properties. The vitrimerized sample V-2 was recycled 2 times without addition of catalyst or alcohol and the mechanical properties were well preserved.

TABLE 2

Mechanical properties of initial UPR and vitrimerized samples.

| Sample Code | Young's modulus [GPa] | Tensile strength [MPa] | Elongation at break [%] | Impact strength [kJ/m$^2$] |
|---|---|---|---|---|
| Initial UPR | 1.7 ± 0.1 | 18.2 ± 3.3 | 4.1 ± 0.1 | 1.47 ± 0.02 |
| Ball milled UPR | 1.2 ± 0.2 | 18.6 ± 1.6 | 3.6 ± 0.3 | 1.33 ± 0.02 |
| V-1 | 0.9 ± 0.3 | 14.8 ± 1.7 | 2.4 ± 0.0 | 1.17 ± 0.09 |
| V-2 | 1.9 ± 0.1 | 20.8 ± 0.5 | 2.8 ± 0.5 | 1.30 ± 0.06 |
| V-3 | 1.8 ± 0.4 | 21.3 ± 1.1 | 3.3 ± 0.0 | 1.07 ± 0.04 |
| V-2 Reprocessed | 2.3 ± 0.3 | 20.0 ± 1.5 | 3.3 ± 0.3 | 1.40 ± 0.05 |

After converting the thermoset into a vitrimer-like dynamic network, the vitrimerized samples can be recycled and reprocessed for multiple times without adding more catalyst. To test this, the vitrimerized sample V-2 was recycled 2 times without addition of catalyst or alcohol and the mechanical properties were well preserved, verifying the full recyclability achieved by this vitrimerization approach.

The vitrimerized samples processability through extrusion was also established, with the ball milled sample V-3 being extruded using a twin-screw counter rotating minilab operating at a temperature of 200° C. and screw speed of 50 rpm with 10 minutes residence time. Some of the extruded strands were forced into a rectangular shaped mold, a process akin to injection molding. Both instances demonstrate potential for the fabrication of vitrimer polymers from UPR thermoset waste already present in the market, as well as suggesting its suitability for scale up for industrial applications.

UPR thermosets present a somewhat distinct case in comparison to the other compositions described herein. In addition to studying activation energy and welding efficacy for vitrimerization of UPR thermosets with different compositions, stress relaxation experiments confirm that the unrecyclable thermoset was successfully converted into a vitrimer. The intractable 3D network of the initial UPR does not allow the stress to relax. By contrast, the vitrimerized samples relax the stress quickly due to the transesterification reaction.

It was also found that the amount of catalyst and formation of zinc carboxylate complexes are more important for converting the UPR thermoset into a vitrimer than the concentration of external hydroxyl groups in the system. This method shows potential for converting UPR thermoset waste already present in the market into vitrimers and is appropriate for industrial applications. The results can provide guidance to overcome the challenges in recycling unsaturated polyester thermoset polymers and tailor the properties of the vitrimerized systems with the least environmental impact.

Example 1

Zinc acetate, bisphenol A diglycidyl ether (DGEBA), glutaric anhydride and imicla7ole were purchased from Sigma-Aldrich. 2,2-Diphenyl-1-picrylhydrazyl (DPPH free radical) was purchased from Alfa Aesar. Copper(I) chloride (99.99%) was purchased from Strem chemicals. Cellulose nanocristals (CNC) were purchased from Cellulose Lab.

An epoxy anhydride thermoset was then prepared. DGEBA (1 eq. epoxy groups), glutaric anhydride (0.5 epoxy equivalents) and imicla7ole (3 wt % to DGEBA) were homogeneously mixed and cured at 120° C. for 8 hours and at 160° C. for another 8 hours to ensure complete crosslinking.

The cured thermoset epoxy was then prepared for vitrimerization. First, approximately 10 g of thermoset was grinded into small particles and then ball milled (Fritsch pulverisette 6) with zinc acetate (2 mol, 5 mol and 10 mol % with respect to the hydroxyl groups) for 1 hour at a speed of 600 rpm yielding vitrimerized epoxy fine powders. For vitrimerization with cellulose nanocrystals, 2 mol % zinc acetate and 10 wt % CNC were ball milled with cured epoxy under identical conditions. All vitrimerized samples were compression molded at 250° C. and 5 MPa for 1 hour.

The vitrimerized epoxy dry powders were sandwiched between two plates using a stainless steel compression mold and pressed at 250° C. and 5 MPa pressure for 1 hour, so as to create reprocessed articles which can be further characterized according to the procedures herein, as well as others well known in this field, including: stress relaxation (using TA ARES-G2 rheometer using a 25 mm plate-plate geometry on samples with thickness of 1.5 mm); dilatometry (using the TA Instruments Q800 DMA apparatus in tension while applying heating rates of 5° C./min from 25 to 300° C.); dynamic mechanical analysis (DMA) (using TA Instruments Q800, operating in tensile mode with a constant frequency of 1 Hz at a strain amplitude of 0.05%, in order to determine the storage modulus (E') and glass transition temperature ($T_g$) (from the peak of the loss modulus) by scanning at 5° C./min from 0° C. to 200° C.); Fourier transform infrared spectroscopy (FTIR) (using a Perkin Elmer System series 2000 spectrophotometer in a spectral range of 4000650 cm$^{-1}$); UV and visible light spectra (using a V670 from Jasco Inc.); mechanical testing to produce stress-strain curves (via an Instron 1011 universal testing instrument in tensile mode); Small Angle X-ray Scattering (SAXS) (at room temperature on Rigaku MicroMax-002+ X-ray generator equipped with a Confocal Max-Flux optic and a microfocus X-ray tube source operating at 45.1 kV and 0.87 mA); differential scanning calorimetry (DSC) (using TA Instruments Q2000 with a heating rate of 5° C. min$^{-1}$ under nitrogen atmosphere); thermogravimetric analysis (TGA) (using TA Instruments Q500 with an aluminum pan); x-ray photoelectron spectroscopy (XPS) (via an Axis Ultra spectrometer from Kratos Analytical); swelling ratio and gel fraction via sol-gel; and cross-linking density (according to the rubber elasticity theory).

Example 2

Unsaturated polyester resin, 77 Polyester Molding Resin, was used in combination with Methyl ethyl ketone peroxide (MEKP) as initiator, dipentaerythritol, and zinc acetate as a catalyst.

A crosslinked UPR sample was initially prepared. Polyester molding resin (50 g) and MEKP (0.625 g) were mixed at room temperature for 1 min. This resin was crosslinked in a Teflon mold for 24 h at room temperature and for further 3 h at 80° C., the later stage under vacuum.

Vitrimization of the cured UPR followed. The crosslinked pieces were cut into small pieces and then grinded into fine particles (≤500 μm). Then the mixture of the cured UPR fine particles, transesterification catalyst (zinc acetate) and dipentaerythritol of different concentrations were dried in an oven overnight under vacuum and then poured into the ball mill tank (Fritsch pulverisette 6), purged with $N_2$ and finally ball milled into ultrafine powder mixture for 60 min at a speed of 570 rpm. The resultant ultrafine powder mixtures were compression molded at 200° C. and 5 MPa for 60 min in a mold made from stainless steel, to obtain vitrimerized samples. The same procedure was followed for reprocessing the vitrimerized samples except that no catalyst and alcohol was added during the ball milling.

The initial particle size should be less than 500 μm to maximize the efficiency of ball milling process and the final particle size after ball milling should be approximately less than 10 μm. The ball milling should be done for approximately 60 minutes with 4 cycles of grinding for 15 minutes at a speed of 600 rpm and intermediate cooling for 15 minutes.

Commercial grades and sources of unsaturated polyester resin for vitrimerization these processes might include 77 polyester molding resin, and methyl ethyl ketone peroxide (MEKP) as initiator from FIBREGLAST. By adjusting the amount of catalyst and alcohol in the system, the vitrimerization process can be applied to a wide range of polyester thermosets with different formulations and degrees of cross-linking.

The vitrimerized samples were characterized as follows:

Dynamic Mechanical Analysis: TA Instruments Q800 was used in tensile mode to determine the dynamic mechanical properties, storage modulus (E'), and tan (δ) with a constant frequency of 1 Hz and a strain amplitude of 0.05%. The scanning rate of 5° C. $min^{-1}$ from 30 to 230° C. was used during test. The peak of tan (δ) curves was considered for determining the glass transition temperature ($T_g$) of different samples. Dilatometry was performed in tension mode as well. An elongational stress of 100 kPa was used while heating the samples with rate of 5° C. $min^{-1}$ from 50 to 220° C. The strain was measured simultaneously during the test.[43]

Fourier Transform Infrared Spectroscopy (FTIR): FTIR analyses were performed using an Agilent Cary 630 FTIR spectrophotometer within the wavenumber range of 4000-600 $cm^{-1}$.

Mechanical Testing: The samples for tensile tests were molded with sample size of 1.5 mm×11 mm×60 mm and the tests were performed on an MTS Insight tensile instrument with strain rate of 5 mm min'. The impact tests were performed on QPI-IC-12J Universal Impact Tester, according to Notched Izod Impact testing method, ASTM D256. In mechanical testing, each sample were tested multiple times to confirm reproducibility.

Rheology. Stress relaxation experiments were performed on a TA ARES-G2 rheometer with a 25 mm parallel plate geometry. The average thickness of the samples was 1.5 mm. The samples were equilibrated for 20 minutes at desired temperature and then a 1% step strain was applied. A normal force of 10 N was maintained during the experiment to avoid the gap between the sample and plate.

Thermogravimetric Analysis (TGA). The thermal stability of initial UPR and vitrimerized samples was explored by TGA (TA Instruments Q500). The samples were about 10 mg each in an aluminium pan and heated from room temperature to 600° C. with rate of 10° C. min' under a constant $N_2$ flow.

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof.

What is claimed is:

1. A method for recycling a thermoset polymer material, the method comprising:
    selecting a thermoset waste polymer including unsaturated polyester resin, said thermoset waste provided as particles and/or fragments;
    providing a catalyst to the thermoset waste polymer to create a recycling composition;
    adding an alcohol and/or polyol to the recycling composition; and
    milling the recycling composition having the alcohol and/or polyol into vitrimer polymer, wherein the vitrimer polymer includes a dynamic recyclable network in which a portion of the catalyst forms ligands with a portion of the thermoset waste polymer.

2. The method according to claim 1 further comprising reprocessing the vitrimer polymer to form a recycled article including the thermoset polymer material.

3. The method according to claim 2 further comprising providing cellulose nanocrystals to the vitrimer polymer prior to the reprocessing.

4. The method according to claim 1 wherein the catalyst comprises zinc.

5. The method according to claim 1 wherein the catalyst comprises a metal salt including at least one of zinc, tin, magnesium, cobalt, calcium, titanium and zirconium.

6. The method according to claim 1 wherein the catalyst is provided at less than 10.0 wt. % of a mass of the recycling composition.

7. The method according to claim 1 wherein the amount of the amount of catalyst provided to the recycling composition is selected relative to a number of hydroxyl groups in the alcohol and/or polyol.

8. The method according to claim 1 further comprising compression molding the vitrimer polymer.

9. A mechanochemical process for recycling cross-linked thermoset polymer material comprising:
    providing and mixing cured thermoset polymer material and a transesterification catalyst;
    milling the cured thermoset polymer material and the catalyst to create vitrimerized powder; and
    processing the vitrimerized powder to create a vitrimerized article.

10. The process according to claim 9 wherein the cured thermoset polymer material includes particles and/or fragments of cross-linked, unsaturated polyester resin.

11. The process according to claim 10 wherein an alcohol and/or polyol is provided before or during the milling step.

12. The process according to claim 10 wherein the particles and/or fragments consist of particles all having a maximum diameter of 500 micrometers or less.

13. A method for recycling a thermoset polymer material, the method comprising:
   selecting a thermoset waste polymer, said thermoset waste provided as particles and/or fragments;
   providing a catalyst to the thermoset waste polymer to create a recycling composition; and
   milling the recycling composition into vitrimer polymer, wherein the vitrimer polymer includes a dynamic recyclable network in which a portion of the catalyst forms ligands with a portion of the thermoset waste polymer.

14. The method according to claim 13 wherein the catalyst comprises zinc.

15. The method according to claim 13 wherein the catalyst comprises a metal salt including at least one of zinc, tin, magnesium, cobalt, calcium, titanium and zirconium.

16. The method according to claim 13 wherein the thermoset waste polymer is at least one selected from a polyester polymer, an epoxy/acid, an epoxy/anhydride, a polyurethane, a vinyl ester, and any combination of two or more thereof.

17. The method according to claim 13 wherein the thermoset waste polymer comprises an unsaturated polyester, polyester based polyurethane, an epoxy, a polyester, and/or any crosslinked polymeric network having: (i) ester groups on a backbone polymer chain, and (ii) hydroxyl (OH) groups.

18. The method according to claim 13 wherein the vitrimer polymer is formed as a fine powder.

19. The method according to claim 13 further comprising measuring a ratio of hydroxyl to ester groups in the thermoset waste polymer so as to determine an amount of catalyst required.

20. The method according to claim 19 wherein the ratio of hydroxyl to ester is at least 1:2 and less than 1:10.

21. The method according to claim 19 wherein the ratio of hydroxyl to ester is less than or equal to 1:1 and greater than 1:10.

* * * * *